US009049956B2

(12) United States Patent
Bruno et al.

(10) Patent No.: US 9,049,956 B2
(45) Date of Patent: Jun. 9, 2015

(54) RIGID GRILL STRUCTURE

(75) Inventors: Adrian A. Bruno, Rolling Meadows, IL (US); Charles Choi, Chicago, IL (US); Sonny Siazon, Woodstock, IL (US)

(73) Assignee: Weber-Stephen Products Co., Palatine, IL (US)

( * ) Notice: Subject to any disclaimer, the term of this patent is extended or adjusted under 35 U.S.C. 154(b) by 1532 days.

(21) Appl. No.: 12/577,475

(22) Filed: Oct. 12, 2009

(65) Prior Publication Data
US 2011/0079209 A1      Apr. 7, 2011

Related U.S. Application Data

(63) Continuation-in-part of application No. 29/344,963, filed on Oct. 7, 2009, now Pat. No. Des. 618,486.

(51) Int. Cl.
*A47J 37/00* (2006.01)
*A47J 37/07* (2006.01)
*A47J 36/34* (2006.01)

(52) U.S. Cl.
CPC .............. *A47J 37/0704* (2013.01); *A47J 36/34* (2013.01); *A47J 37/07* (2013.01)

(58) Field of Classification Search
CPC ........ A47J 37/07; A47J 36/34; A47J 37/0704
USPC ............ 126/30, 50, 37 R, 305, 275 R, 304 R, 126/25 R, 41 R, 9 B, 9 R, 19 M; 16/410, 366, 16/371; 24/460, 168, 457, 584.1, 458, 24/335; 108/50.11, 152, 157.13, 158; 403/358, 388, 389, 391, 396; 52/655.1
See application file for complete search history.

(56) References Cited

U.S. PATENT DOCUMENTS 24,303 A *  6/1859  Harrow ......................... 172/713
82,738 A * 10/1868  Moorehead ................... 403/188

(Continued)

FOREIGN PATENT DOCUMENTS

| CA | 2354785 A1 | 11/2002 |
| CA | 2388278 A1 | 10/2003 |

(Continued)

OTHER PUBLICATIONS

"DE_2725626_A_M—Google Trans.pdf"; Google translation; http://google.com.*

(Continued)

*Primary Examiner* — Gregory Huson
*Assistant Examiner* — Daniel E Namay
(74) *Attorney, Agent, or Firm* — David I. Roche; Baker & McKenzie LLP

(57) ABSTRACT

A cart suitable for supporting a grill, including a grill bowl. The cart has two union members with curved channels for receiving tubular, U-shaped frame members. The union members may be in the form of two similar (but not necessarily identical) halves joined together to enclose the frame members. The tubular channels of the union members resist movement (such as twisting and tilting) in at least two directions. The union members lock the frame members in place with internal protrusions that fit into mating depressions or holes in the frame members. Extra rigidity is added to the cart by one or more side tables which are structural members as well as functional tables. The side tables thus serve as cross-members between two frame assemblies. The grill's lid can easily be tilted back to rest in place on lid supports underneath the bottom edge and contact points on the side tables.

7 Claims, 7 Drawing Sheets

(56) References Cited

U.S. PATENT DOCUMENTS

| | | | | |
|---|---|---|---|---|
| 125,789 A * | 4/1872 | Clark et al. | 24/135 R |
| 266,099 A * | 10/1882 | Cleaves | 108/50.11 |
| 368,055 A * | 8/1887 | Bon | 108/158 |
| 379,221 A * | 3/1888 | Hering | 403/214 |
| 508,687 A * | 11/1893 | Duggan | 174/157 |
| 577,220 A * | 2/1897 | Whitehead | 294/209 |
| 828,882 A * | 8/1906 | Foster | 248/176.2 |
| 990,055 A * | 4/1911 | Lightner | 108/152 |
| 1,048,566 A * | 12/1912 | Miller | 217/69 |
| 1,104,103 A * | 7/1914 | Carpenter, Jr. | 108/50.11 |
| 1,183,645 A * | 5/1916 | Hubbard | 108/158 |
| 1,482,454 A * | 2/1924 | Batcheller | 362/396 |
| 1,550,476 A * | 8/1925 | Weinberg et al. | 403/215 |
| 1,798,223 A * | 3/1931 | Richardson | 403/391 |
| 2,026,011 A * | 12/1935 | Wright | 108/141 |
| 2,088,890 A * | 8/1937 | Winby et al. | 403/188 |
| 2,155,772 A * | 4/1939 | Porter | 108/157.13 |
| 2,165,221 A * | 7/1939 | Burton | 403/286 |
| 2,222,038 A * | 11/1940 | Larkin | 403/396 |
| 2,248,170 A * | 7/1941 | Hansen | 224/570 |
| 2,288,158 A * | 6/1942 | Ellinwood | 174/135 |
| 2,333,869 A * | 11/1943 | Larkin | 403/396 |
| 2,523,785 A * | 9/1950 | Sereno | 403/188 |
| 2,658,776 A * | 11/1953 | Wilcox | 52/653.2 |
| 2,767,003 A * | 10/1956 | Gilmont | 403/385 |
| 2,810,598 A * | 10/1957 | Lief | 403/334 |
| 2,886,387 A * | 5/1959 | Illene | 108/50.11 |
| 3,162,719 A * | 12/1964 | Mulford | 52/633 |
| 3,295,473 A * | 1/1967 | Wentworth | 108/152 |
| 3,538,906 A | 11/1970 | Heraty et al. | |
| 3,620,174 A * | 11/1971 | Dentino | 108/151 |
| 3,685,862 A * | 8/1972 | Rudolf | 52/655.1 |
| 3,861,816 A * | 1/1975 | Zaidan | 403/385 |
| 3,942,822 A * | 3/1976 | Lewis | 74/551.3 |
| 3,950,758 A * | 4/1976 | Mirrione et al. | 343/881 |
| 4,063,585 A * | 12/1977 | Stanley | 160/135 |
| 4,066,373 A * | 1/1978 | Workman | 403/391 |
| 4,074,492 A * | 2/1978 | Simpson et al. | 52/419 |
| 4,090,490 A * | 5/1978 | Riley et al. | 126/25 R |
| 4,195,942 A * | 4/1980 | Kestner | 403/13 |
| 4,200,053 A * | 4/1980 | Vall | 114/230.26 |
| 4,390,002 A * | 6/1983 | Daily, III | 126/25 R |
| 4,435,880 A * | 3/1984 | Gardner | 24/66.3 |
| 4,440,519 A | 4/1984 | Pennel et al. | 403/391 |
| 4,471,159 A * | 9/1984 | Frank, Jr. | 174/94 R |
| 4,597,690 A * | 7/1986 | Girard | 403/391 |
| 4,718,399 A * | 1/1988 | Shepherd | 126/25 R |
| 4,840,390 A * | 6/1989 | Lockard et al. | 280/250.1 |
| 4,955,358 A * | 9/1990 | Harris et al. | 126/25 R |
| 5,013,176 A * | 5/1991 | Orbom | 403/171 |
| 5,016,607 A * | 5/1991 | Doolittle et al. | 126/25 R |
| 5,027,788 A * | 7/1991 | Schlosser et al. | 126/25 R |
| 5,069,196 A * | 12/1991 | Schlosser et al. | 126/25 R |
| 5,109,834 A * | 5/1992 | Collins et al. | 126/41 R |
| 5,127,759 A * | 7/1992 | Orbom | 403/171 |
| 5,140,973 A * | 8/1992 | Home | 126/41 R |
| 5,158,067 A * | 10/1992 | Dutro et al. | 126/39 R |
| 5,261,682 A * | 11/1993 | Chuang | 280/42 |
| 5,299,553 A | 4/1994 | Giebel et al. | |
| 5,498,098 A * | 3/1996 | Cairns | 403/400 |
| 5,501,544 A * | 3/1996 | Cairns | 403/400 |
| 5,515,795 A * | 5/1996 | Ledermann et al. | 111/174 |
| 5,623,866 A * | 4/1997 | Home | 99/444 |
| 5,769,556 A * | 6/1998 | Colley | 403/24 |
| 5,794,608 A * | 8/1998 | Von Berg | 126/25 R |
| 5,794,897 A * | 8/1998 | Jobin et al. | 248/74.4 |
| 5,865,099 A * | 2/1999 | Waugh | 99/340 |
| 5,918,998 A * | 7/1999 | Pourmand | 403/218 |
| 5,967,612 A * | 10/1999 | Takei | 297/391 |
| 5,983,912 A * | 11/1999 | Leu | 135/66 |
| 6,003,883 A * | 12/1999 | Brenneman | 280/30 |
| 6,102,610 A * | 8/2000 | Palusis et al. | 403/388 |
| 6,261,025 B1 * | 7/2001 | Husson et al. | 403/188 |
| 6,334,284 B1 * | 1/2002 | Provitola | 52/698 |
| 6,343,891 B1 * | 2/2002 | Combs | 403/391 |
| 6,397,731 B1 * | 6/2002 | Gillespie et al. | 99/339 |
| 6,422,230 B1 * | 7/2002 | Stewart et al. | 126/25 R |
| 6,474,327 B1 | 11/2002 | Bossler et al. | |
| 6,536,982 B2 * | 3/2003 | Gibbons et al. | 403/97 |
| 6,561,082 B2 * | 5/2003 | Gillespie et al. | 99/339 |
| 6,579,032 B1 * | 6/2003 | Ledingham | 403/400 |
| 6,612,086 B2 * | 9/2003 | Pitt | 52/665 |
| 6,679,245 B1 * | 1/2004 | Lu | 126/25 R |
| 6,684,876 B2 | 2/2004 | Bossler et al. | |
| 6,694,964 B2 * | 2/2004 | Wu | 126/25 R |
| 6,715,723 B2 * | 4/2004 | Zhu | 248/129 |
| 6,739,329 B2 * | 5/2004 | Wu | 126/41 R |
| 6,910,475 B2 * | 6/2005 | Zelek et al. | 126/25 R |
| 6,929,275 B1 * | 8/2005 | Schlangen | 280/250.1 |
| 6,951,213 B2 * | 10/2005 | Coleman et al. | 126/38 |
| 6,981,497 B2 * | 1/2006 | DeMars | 126/38 |
| 7,198,284 B2 * | 4/2007 | Cerreto et al. | 280/650 |
| 7,814,843 B2 * | 10/2010 | Chen et al. | 108/42 |
| 8,156,861 B1 * | 4/2012 | Prokopow | 99/419 |
| 8,523,858 B2 * | 9/2013 | Lessig et al. | 606/54 |
| 2002/0078944 A1 * | 6/2002 | Cozzolino et al. | 126/41 R |
| 2002/0112718 A1 * | 8/2002 | Johnson | 126/25 R |
| 2003/0000516 A1 * | 1/2003 | Hsu et al. | 126/25 R |
| 2003/0006578 A1 * | 1/2003 | Melgarejo et al. | 280/250.1 |
| 2003/0025050 A1 | 2/2003 | Brake | |
| 2003/0029324 A1 * | 2/2003 | Gillespie et al. | 99/340 |
| 2003/0034024 A1 * | 2/2003 | Wu | 126/41 R |
| 2003/0037781 A1 * | 2/2003 | Wu | 126/25 R |
| 2004/0007228 A1 * | 1/2004 | Lu | 126/25 R |
| 2004/0112361 A1 * | 6/2004 | Zelek et al. | 126/25 R |
| 2004/0244790 A1 * | 12/2004 | McKenzie et al. | 126/41 R |
| 2005/0247299 A1 * | 11/2005 | Rodriguez | 126/50 |
| 2005/0279341 A1 * | 12/2005 | Chung | 126/9 R |
| 2007/0172312 A1 * | 7/2007 | Wang | 403/388 |
| 2008/0078374 A1 * | 4/2008 | Polkinghorn et al. | 126/194 |
| 2009/0308287 A1 * | 12/2009 | Chen et al. | 108/42 |
| 2010/0257705 A1 * | 10/2010 | Ciobotaru | 24/457 |
| 2012/0131769 A1 * | 5/2012 | Machacs | 24/457 |

FOREIGN PATENT DOCUMENTS

| | | | | |
|---|---|---|---|---|
| DE | 2725626 | * | 12/1978 | F16B 12/40 |
| DE | 2903126 A1 | | 1/1979 | |
| EP | 29314 A1 | * | 5/1981 | F16L 3/22 |
| EP | 41855 A1 | * | 12/1981 | F16B 7/04 |
| FR | 2652134 A1 | * | 3/1991 | F16B 7/04 |
| GB | 29677 | | 0/1914 | |
| GB | 2462074 B | | 2/2010 | |
| JP | 7217079 A | | 8/1995 | |

OTHER PUBLICATIONS

"DE_2725626_A_M—Mach Trans.pdf"; Machine translation; http://epo.org.*

Office Action received from Russian Patent Office; translation of same; and the "Joker" reference cited therein.

Weber Performer Owner's Guide #78763 published in the US on Feb. 13, 2008.

* cited by examiner

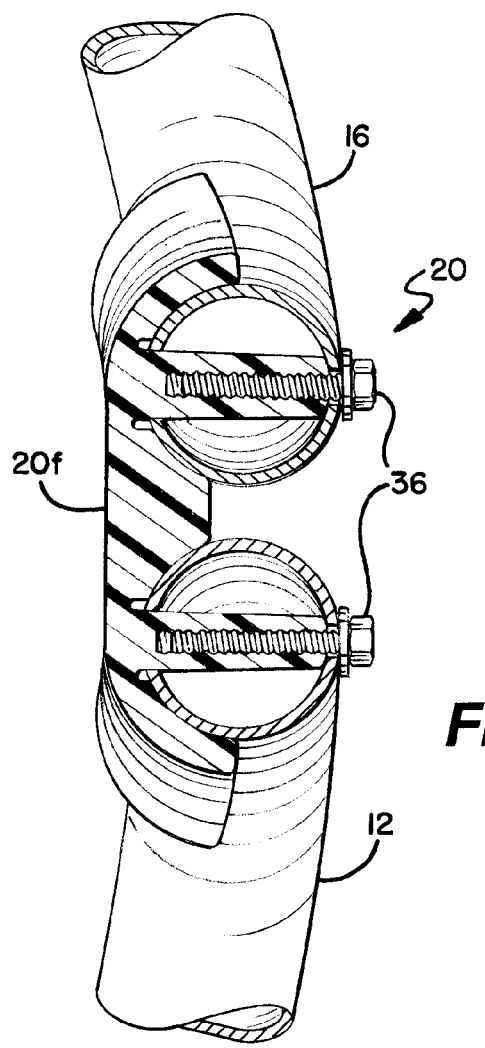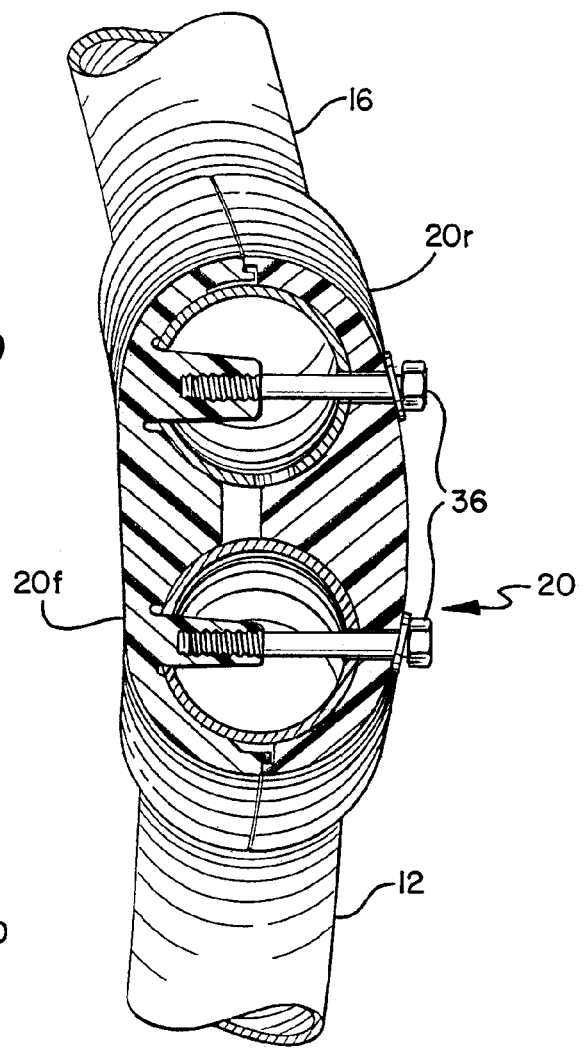
FIG. 3b
FIG. 3c

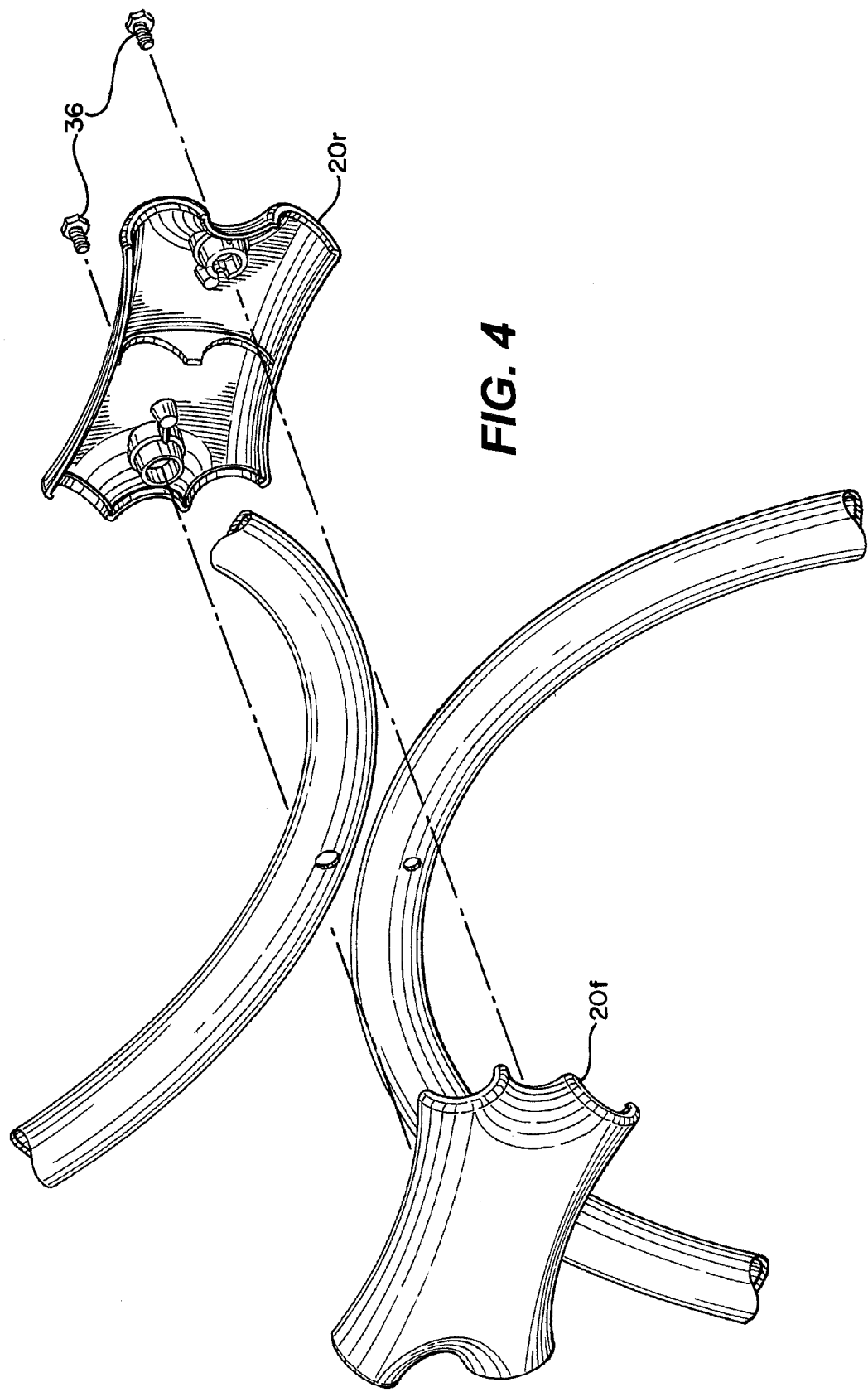

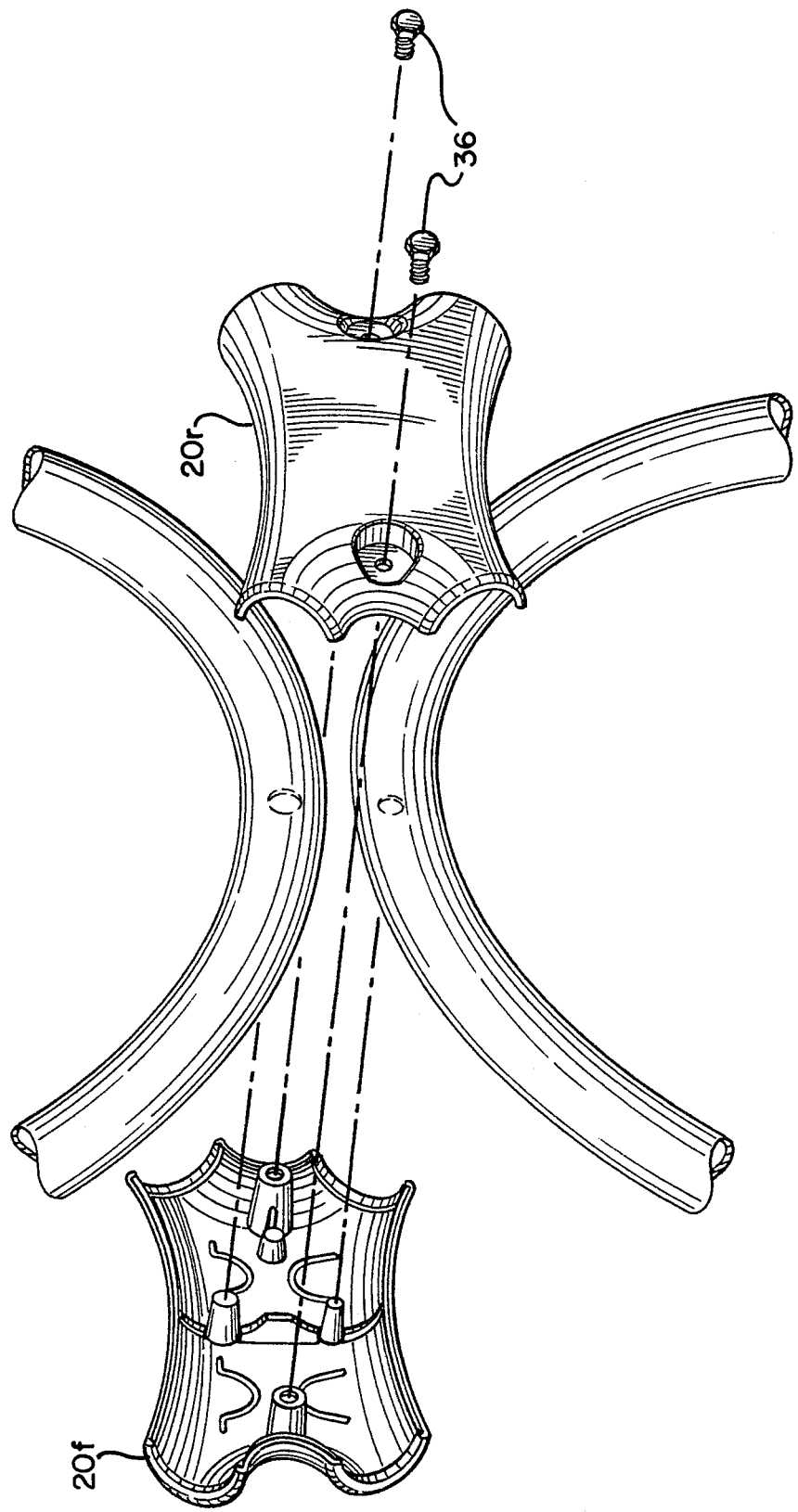

RIGID GRILL STRUCTURE

CROSS-REFERENCE TO RELATED APPLICATIONS

This is a continuation-in-part of U.S. patent application Ser. No. 29/344,963, which was filed Oct. 7, 2009 now U.S. Pat. No. D618,486 and is incorporated herein by reference.

BACKGROUND AND SUMMARY OF THE INVENTION

Carts for barbecue grills are quite common and come in a variety of forms. Most carts used to support a barbecue grill are left outside and are, therefore, exposed to extreme environmental conditions, including being left outside through a harsh winter and a hot summer. In addition, grill carts undergo rough treatment, since they are designed to be frequently moved about an owner's property.

Grill bowls that are supported by barbecue grill carts tend to be quite heavy and require substantial structural support. Furthermore, since the temperature inside the bowl of a barbecue grill can get extremely high, for safety purposes, structural stability of a barbecue grill cart is of utmost importance.

The exemplary grill cart described here achieves great structural strength and rigidity with a minimum number of fasteners, and is very visually appealing. These advantages are achieved, at least in part, by a pair of clamshell-like castings that secure pairs of tubular legs and upper frame members, and by incorporating side tables that are not only functional, but also serve as structural members to add rigidity to the cart without adding additional parts.

In an exemplary embodiment of the cart, a clamshell-like union member is used to connect together an upper frame and a lower frame to form a first frame assembly. The upper frame and lower frame may be U-shaped tubes, with the lower frame being an upside-down "U" and the upper frame being right-side up. The union member may be a rigid metal casting in the form of two mating halves. Other materials and manufacturing techniques may be used to form the union member. The two halves of each union member can be joined together by any well-known fasteners, such as screws, bolts, rivets, or equivalent fasteners. The two halves may also be welded together.

The union member can be used to create a substantially rigid frame assembly because its internal shape (a curved tubular channel) conforms to the upper and lower frames, preventing twisting and movement in multiple directions. Further, the union member can be formed with protrusions that mate with holes or depressions in the upper and lower frame members to hold or lock the frame members in place. Such protrusions will also ease the assembly of the cart, since they ensure that the upper and lower frame members are positioned properly even before the two halves of the union member are completely joined and fastened together. The protrusions inside the union member can be of different sizes—for example, the protrusion may be larger on the upper side of the union member, so that only the upper frame will mate with it. This prevents improper assembly of the grill cart.

The exemplary embodiment may also include one or more cross-members to connect the first frame assembly to a second frame assembly. The second frame assembly may be substantially the same as the first frame assembly, or it may be different. Two bowl supports extending between the two frame assemblies hold the bowl of the grill to the assembled frame. One or more rigid side tables also serve as structural cross-members that connect the first frame assembly to the second frame assembly. The side tables need not be attached to the bowl, but may be separated from the bowl by a space. The side tables (or alternatively, the grill bowl) may be fitted with pivot points that support the lip of the grill's lid when the lid is lifted off the bowl and tilted back. In such an embodiment, the lid is prevented from falling by the back edges of the side tables, so that the lid may be easily opened and closed without any hooks or other devices attached to the lid itself.

BRIEF DESCRIPTION OF THE DRAWINGS

FIG. 3b is a cross-sectional view of a second embodiment of the union member and the upper and lower frames;

FIG. 3c is a cross-sectional view of a third alternative embodiment of the union member and the upper and lower frames;

FIG. 4 is an exploded view of the first embodiment of a union member and upper and lower frames before assembly;

FIG. 5 is the exploded view of FIG. 5 from a different angle;

DETAILED DESCRIPTION OF THE INVENTION

While the inventions shown and described herein are capable of being practiced with numerous alternative embodiments, a particular one is shown and described in detail herein. However, the embodiment shown and described in detail is merely an example of the many embodiments that could be made in accordance with the grill cart claimed herein, and which will be apparent to those skilled in the art of grill cart design.

Figure 1:
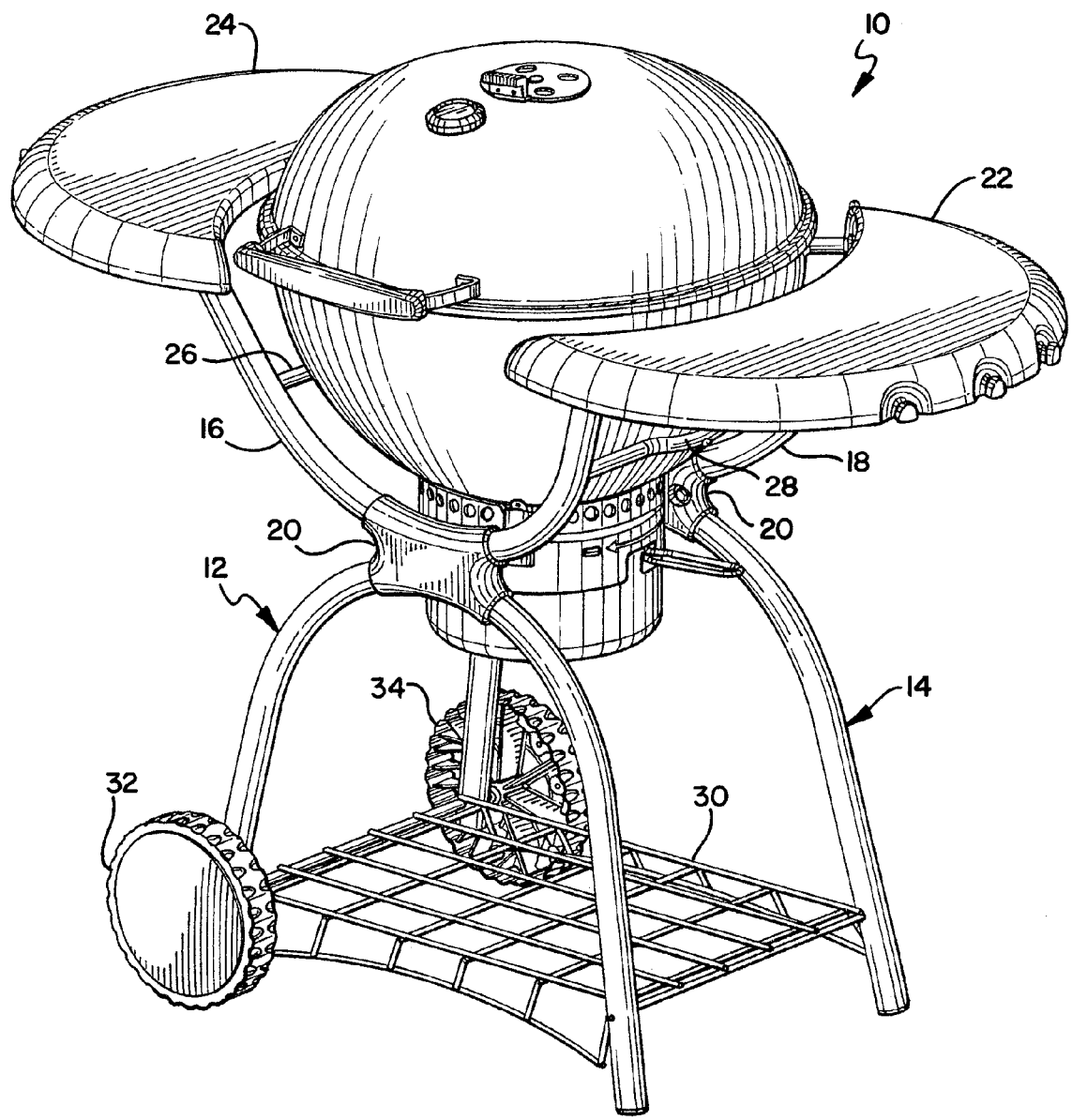
FIG. 1 is a perspective view of one embodiment of the grill cart and grill with the bowl and lid in place.

As illustrated in FIG. 1, a grill cart 10 includes two generally U-shaped lower frames 12 and 14, and two generally U-shaped upper frames 16 and 18. The upper and lower frames may be metal tubes. Each lower frame is attached to each upper frame by a rigid union member 20, which may be a metal casting or other rigid material such as, for example, a thermosetting plastic. Each upper frame in the embodiment shown is attached to its counterpart by two side tables, 22 and 24. The lower frames also hold two bowl supports 26 and 28 in place. The two side tables may be attached to the upper frames with bolts, screws, or other fasteners that pass through brackets that are rigidly attached to the upper frames. As will be discussed in more detail below, each side table functions as a rigid cross-member in addition to providing a convenient surface for barbecue tools, food, etc. The side tables may be made of thermosetting plastic or they may be made of any other suitable, rigid material, such as metal.

To simplify construction and save on fasteners, the bowl supports 26, 28 may simply be inserted into blind holes in the upper frames 16, 18, and be held in place because the two upper frames 16, 18 are held at a fixed distance from each other by the side tables 22, 24. Preferably, the bowl supports 26, 28 may be curved so that their shape supports the bowl. In this way, just a single screw (rather than two) can support the bowl, and the support can float between the upper frames 16, 18. More specifically, the bowl supports 26, 28 support the bowl primarily at two points, one on either side of the screw. The bowl contacts the bowl supports at two points due to the curved shape of the bowl supports 26, 28, and because they are placed below the great circle of the bowl, the bowl has no natural freedom or tendency to rotate or move about the supports.

In addition to the bowl supports, a wire rack 30 mounted between the lower frames 12, 14 also "floats"—that is, it is held in place not by fasteners but by the fact that the lower frames 12, 14 are held at a fixed distance apart by the overall structure of the grill cart. The ends of the wire rack 30 are simply inserted into holes in the lower frames during assembly, with no fasteners required. Two wheels 32, 34 of the grill cart also serve to hold the wire rack 30 in place, because the end "wire" of the wire rack extends through the lower frame and serves as the axle to wheels 32, 34.

Figure 2:
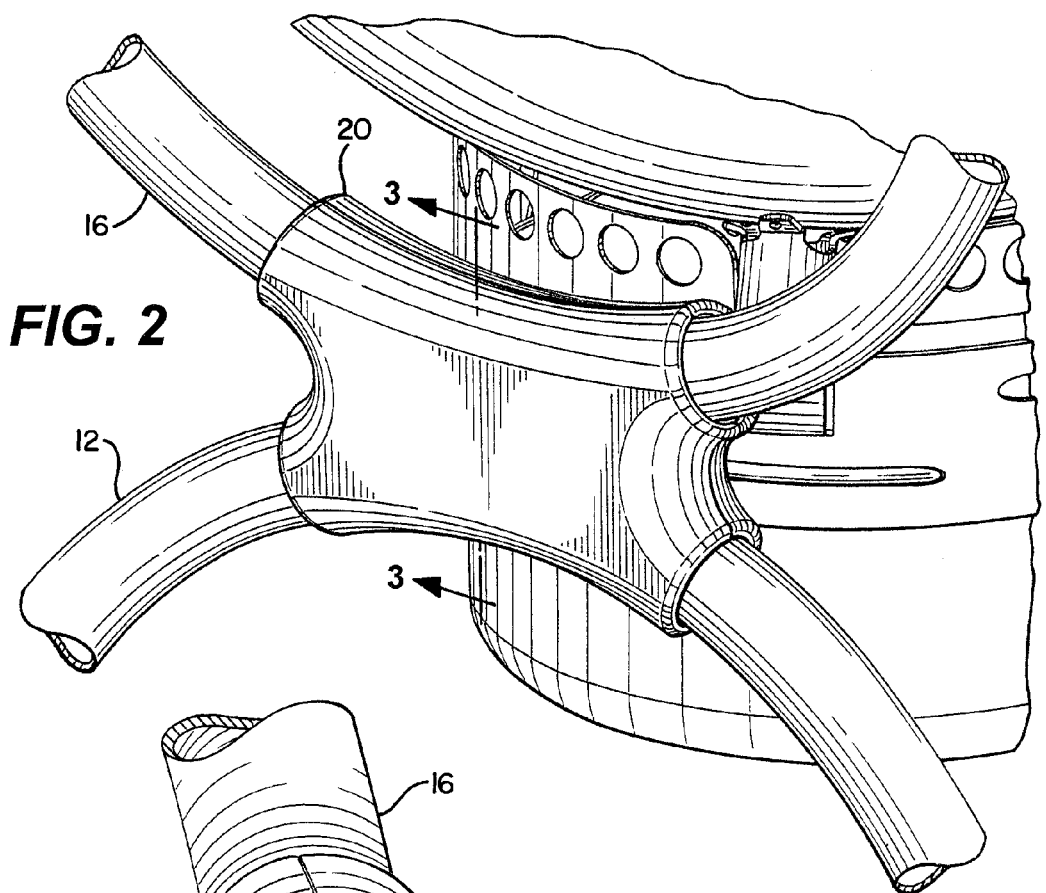
FIG. 2 is a close up view of a first embodiment of the union member of the grill cart of FIG. 1 with the upper and lower frames installed.
Figure 3A:
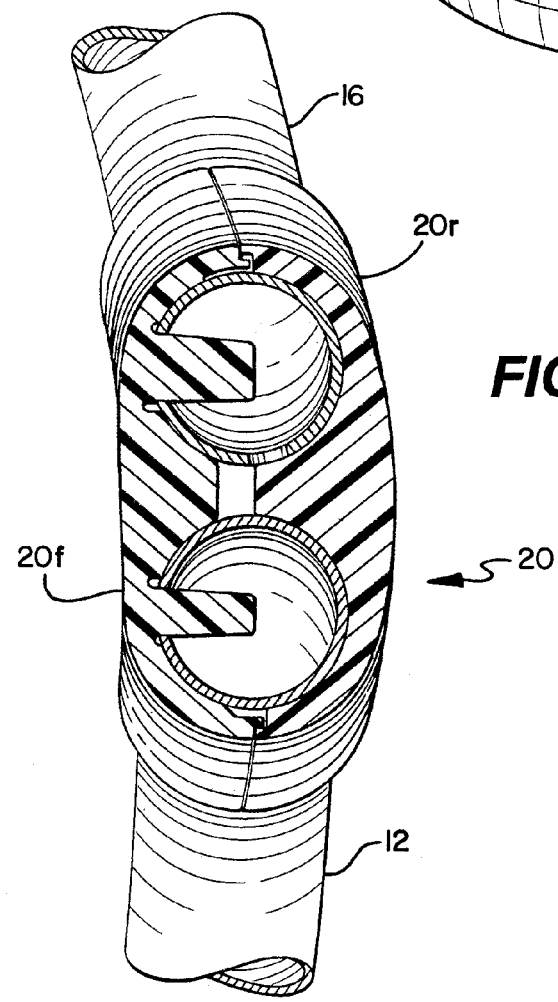
FIG. 3a is a cross-sectional view of the first embodiment the union member and the upper and lower frames.

FIGS. 2 and 3a show the union member 20 and the lower and upper frames 12, 16 in greater detail. (Although upper frames 12, 16 are shown in these figures, the opposite side of the grill cart is substantially similar, so the figures could also represent the other side, with union member 20 joining lower frame 14 and upper frame 18). FIG. 3a in particular shows a cross-sectional view of one frame assembly—that is, an upper frame and a lower frame held together by a union member 20. The front half of union member 20, labeled 20f, is shown with internal protrusions that fit into holes (or depressions) in the lower and upper frame tubes 12 and 16, respectively. Of course, the protrusions could be on the rear half of union member 20 instead of the front half, or both the front and rear halves could have protrusions. As shown in FIG. 3a, the protrusions may be different sizes, which prevents improper assembly of the grill cart. The protrusions also serve to hold the upper and lower frames in place during assembly. The protrusions also add rigidity to the grill cart by helping to hold the upper and lower frames firmly in place once the grill cart is assembled—they prevent the frames from sliding or rotating within the union member 20.

FIG. 3b shows an alternative embodiment, where the protrusions are internally threaded to receive threaded fasteners to hold the two halves of the union member 20 together. In this embodiment, union member half 20f would receive threaded fasteners 36 while union member half 20r would have additional holes through which the fasteners 36 would fit. As yet another alternative, shown in FIG. 3c, a single-piece union member could be used to join the lower and upper frames. This embodiment could also be accomplished by internal threads on the protrusions on piece 20f (or on another internal part of piece 20f that does not protrude through or into frame 12 or 16), which could receive threaded fasteners 36 that pass through holes in lower frame 12 and upper frame 16. Of course, for added strength and rigidity, more than one fastener per frame member could be used, which fastener may or may not fit into a protrusion as shown in FIG. 3c.

FIG. 4 shows the union member 20 (represented by pieces 20f and 20r) and an upper and lower frame member prior to assembly. As shown, the two halves of union member 20 can be joined by screws or bolts 36. Each half of union member 20 has channels for receiving the frame members—an upper channel for the upper frame, and a lower channel for the lower frame. Due to the construction of the union member halves, the channels are not shown as being "solid"—that is, they are not in contact with the frame continuously, although such a construction would of course be possible. Rather, the channels include a number of semi-circular ribs that contact the frames members to hold them securely in place. FIG. 4 shows that union member half 20r has three such ribs, but a channel comprising more or fewer ribs is also possible, and would perform the same function of preventing twisting or other unwanted movement of the frames within the union member.

FIG. 5 is another view of the union member 20 and two frame members prior to assembly. In this view, the protrusions on union member half 20f can be seen before they are inside the mating holes in the upper and lower frames.

Figure 6:
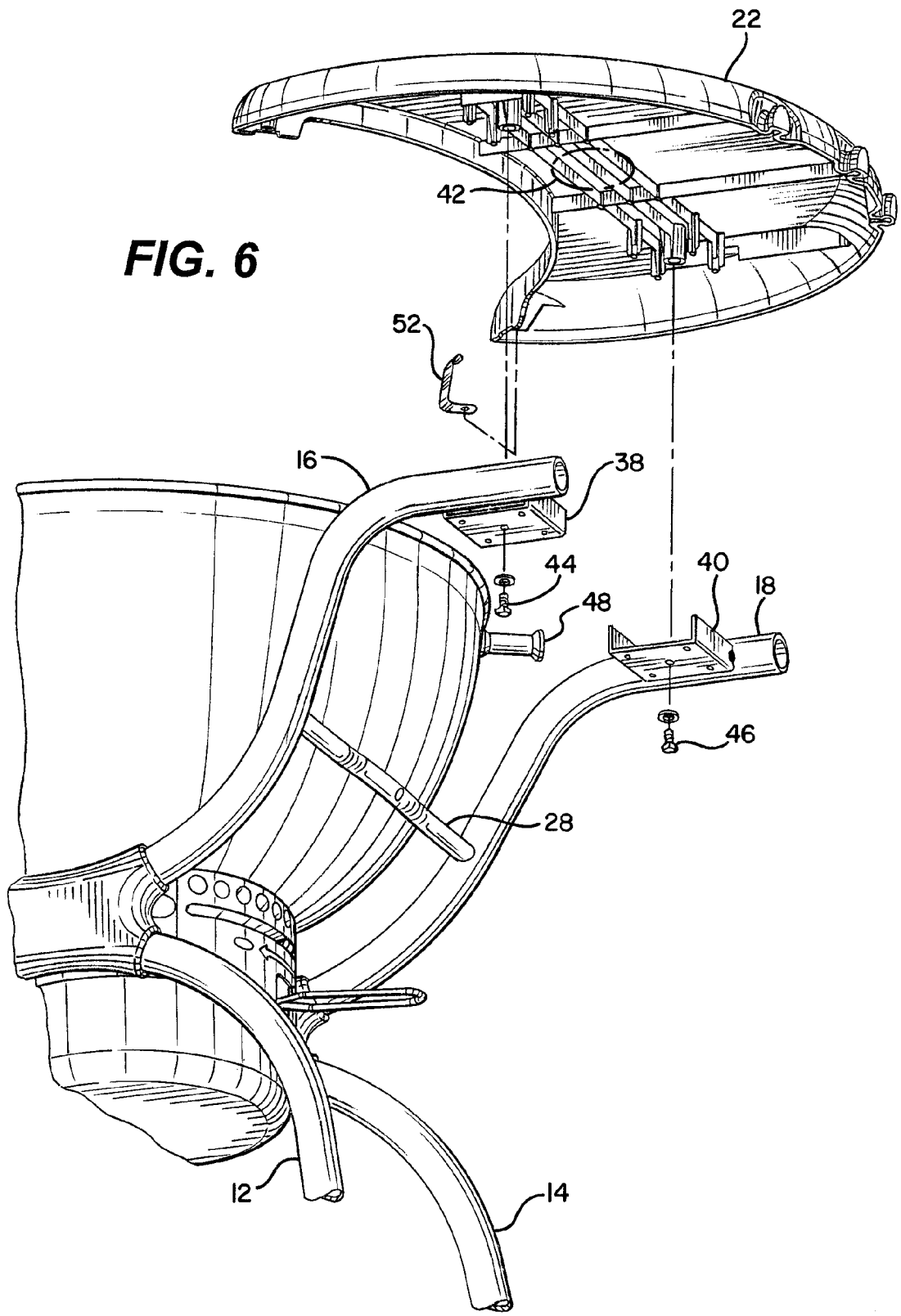
FIG. 6 is and exploded view of the upper frames and a side table.

FIG. 6 is an exploded view of the upper portion of the grill cart. FIG. 6 illustrates how side table 22 is a structural part of the grill cart, in addition to being a functional table. (It should be noted that the other side of the grill, not shown in FIG. 6, may be similarly constructed). First, the side table 22 may be attached to the upper frames (also called table supports) by brackets 38 and 40, which are rigidly attached to the upper frames. In the embodiment shown, brackets 38, 40 are welded to upper frames 16, 18, respectively. In addition, side table 22 may be formed to have a rigid internal structure, such as the ribs 42 in the illustrated embodiment. As also shown, each bracket may have holes or depressions that mate with protrusions on the side table 22. In the illustrated embodiment, each bracket has four holes. This construction ensures a rigid construction of the grill cart with a minimum of fasteners. As shown, only one fastener (44, 46) is needed for each bracket, but because the holes in the brackets mate with protrusions in the side table, there is no swaying or "parallelogram effect." For clarity, roller 48 and spring clip 52 are shown in this figure also, but will be discussed in more detail with respect to FIG. 7.

Figure 7:
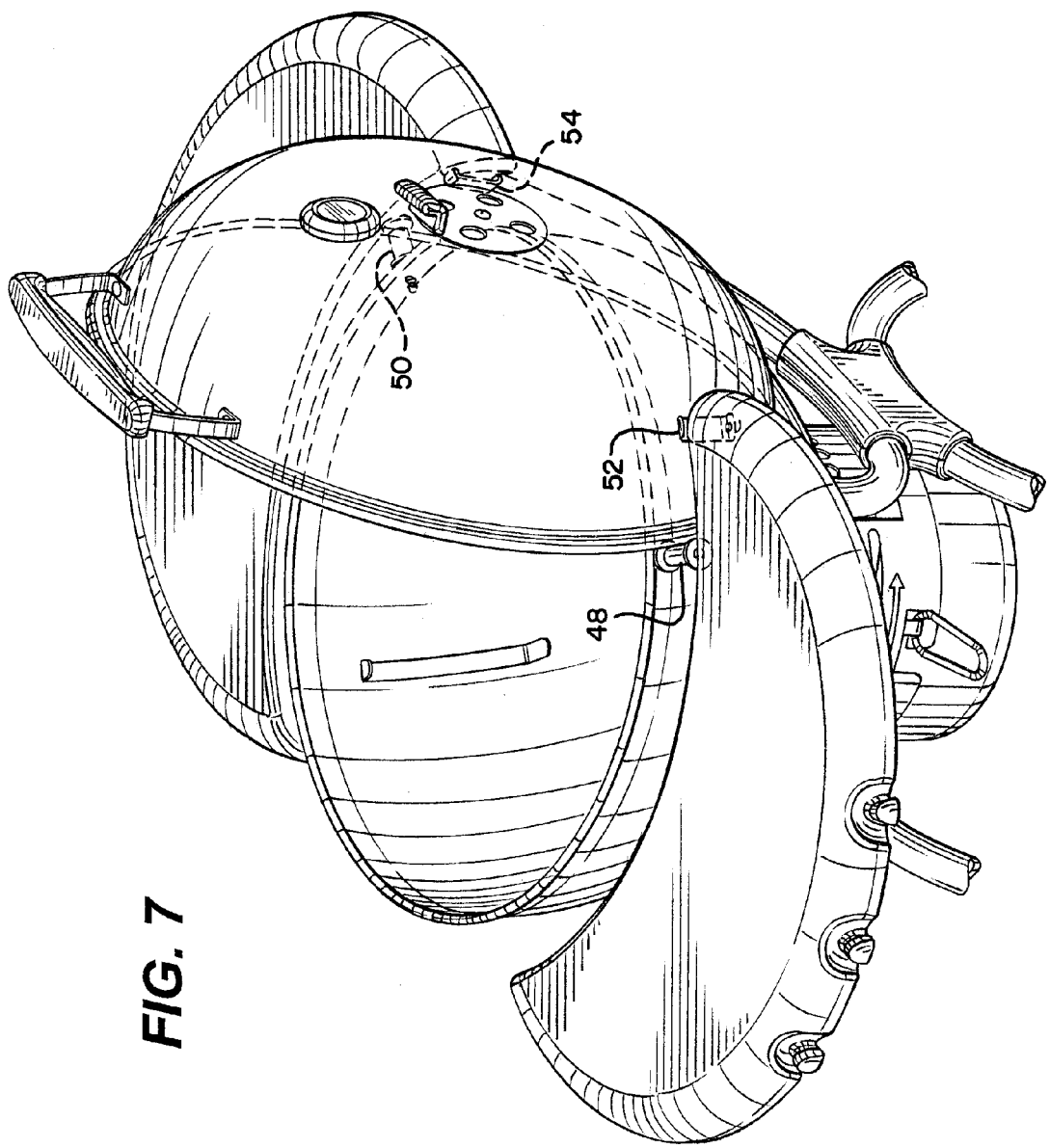
FIG. 7 is a view of the grill with the lid in the open position.

FIG. 7 illustrates another feature of the grill cart: Since the side tables are spaced-apart from the grill bowl, the side tables can be used to help hold the grill lid in place. As shown, the lower edge of the grill lid is supported in two places by rollers 48 and 50. The lid is prevented from falling by spring clips 52, 54 attached to the side tables. Alternatively, the side tables themselves could serve to hold the lid in place. In accordance with these embodiments, the lid can be simply lifted by handle 56 and moved to the position shown. In this manner, opening the grill is easier than some grills which have a bracket inside the lid that must be hooked on the upper edge of the grill bowl to hold the lid in place. The present embodiment is easier to open because the lid rests on rollers 48 and 50 as soon as the handle 56 is lifted, so the user does not need to support the weight of the lid.

While a specific example of a grill cart structure has been illustrated and described herein, it will be apparent to persons of skill in the art of cart design that numerous modifications, variations and improvements of the embodiment described herein may be made without departing from the spirit and scope of the following claims.

We claim:

1. A cart comprising:
a first union member, wherein the first union member has at least two internal channels;
a second union member;
an upper frame and a lower frame rigidly connected together by the first union member, the connected upper frame and lower frame forming a first frame assembly, wherein the internal channels are capable of receiving a portion of the upper and lower frames, and wherein the first union member resists rotation of its associated upper frame and lower frame; and
a second upper frame and a second lower frame rigidly connected together by the second union member, the connected upper frame and lower frame forming the second frame assembly;
at least one cross-member extending between the first frame assembly and a second frame assembly, wherein each union member comprises two substantially similar halves capable of being joined together to connect the associated upper frame and lower frame, and wherein each union member comprises at least two protrusions, each protrusion engaging with an associated depression in the upper frame and the lower frame;

wherein each upper frame comprises a tube that is substantially "U" shaped, and wherein the union members are attached to the upper frames at a point substantially equidistant from the ends of the "U" shaped tubes;

at least two substantially rigid side tables connected to the upper frames of the first frame assembly and the second frame assembly, the at least two substantially rigid side tables comprising the at least one cross-member, the at least two substantially rigid side tables further comprising structural components of the cart;

at least two lid supports positioned between the at least two side tables and a grill bowl to support a grill lid in an open position, wherein the grill lid is supported between the at least two lid supports and a part of each side table when the grill lid is in the open position.

2. The cart of claim 1, further comprising a second cross-member.

3. The cart of claim 1, wherein the union member includes two substantially U-shaped channels for securing the upper frame and lower frame, the U-shaped channels providing resistance to movement of the upper frame and the lower frame.

4. The cart of claim 3, wherein the union member resists rotation of the upper frame and the lower frame about at least two points of each frame.

5. A cart comprising:
a first union member, wherein the first union member has at least two internal channels;
wherein the first union member comprises at least one protrusion for engaging with at least one depression in an upper frame or a lower frame, the upper frame and lower frame forming a first frame assembly;
a second union member;
a second upper frame and a second lower frame rigidly connected together by the second union member, the connected second upper frame and second lower frame forming a second frame assembly; each upper frame comprises a tube that is substantially "U" shaped, and wherein the union members are attached to the upper frames at a point substantially equidistant from the ends of the "U" shaped tubes;
at least one cross-member comprising a substantially rigid table connected to the upper frames of the first frame assembly and the second frame assembly;
at least two side tables rigidly connected to an upper portion of the first frame assembly and an upper portion of the second frame assembly, wherein the at least two side tables comprise structural components of the cart; and
at least two lid supports positioned between the at least two side tables and a grill bowl to support an edge of a grill lid in an open position, wherein the grill lid is supported between the at least two lid supports and a part of each side table when the grill lid is in the open position.

6. The cart of claim 5, wherein the at least two lid supports are attached to the grill bowl.

7. A cart comprising:
a first union member;
an upper frame and a lower frame rigidly connected together by the first union member, the connected upper frame and lower frame forming a first frame assembly;
at least one cross-member extending between the first frame assembly and a second frame assembly;
a second union member;
a second upper frame and a second lower frame rigidly connected together by the second union member, the connected upper frame and lower frame forming the second frame assembly;
wherein the first and the second union members comprise two halves capable of being joined together to connect the associated upper frame and lower frame, and wherein each union member comprises at least two protrusions, each protrusion engaging with an associated depression in the upper frame and the lower frame, and wherein each union member resists rotation of its associated upper frame and the lower frame about at least two points;
wherein each upper frame and lower frame comprises a tube that is substantially "U" shaped, and wherein the union members are attached to the upper frames at a point substantially equidistant from the ends of the "U" shaped tubes;
at least two substantially rigid side tables connected to the upper frames of the first frame assembly and the second frame assembly, the at least two substantially rigid side tables comprising the at least one cross-member, the at least two substantially rigid side tables further comprising structural components of the cart;
at least two lid supports rigidly attached to a grill bowl and positioned between the at least two side tables and the grill bowl to support a grill lid in an open position, wherein the grill lid is supported between the at least two lid supports and a part of each side table when the grill lid is in the open position.

* * * * *